United States Patent Office 3,814,653
Patented June 4, 1974

3,814,653
METHOD OF LAMINATING STRUCTURAL MEMBERS
Wilbur C. Heier, Hampton, Va., assignor to the United States of America as represented by the Administrator of the National Aeronautics and Space Administration
Filed Jan. 20, 1972, Ser. No. 219,435
Int. Cl. B32c 11/00
U.S. Cl. 156—285                    10 Claims

ABSTRACT OF THE DISCLOSURE

A laminate is provided by providing a lightweight core material, such as a honeycombed plastic, metal, or the like, within the cavity defined by an annular mold cavity frame. Face sheets, which are to be bonded to the core material, are provided on opposite sides of the frame and extend over the frame thus sealing the core material in the cavity. An adhesive is provided between the core material and the face sheets and the combined thickness of the core material and adhesive is a close fit within the opposed face sheets. A gas tight seal, such as an O-ring gasket, is provided between the frame and the face sheet members to form a gas tight cavity between the face sheet members and the frame. External heat and pressure are used to bond the face sheets to the core material. Gas pressure is introduced into the sealed cavity to minimize out-gasing of the adhesive.

ORIGIN OF THE INVENTION

The invention described herein was made by an employee of the United States Government and may be manufactured and used by or for the Government for governmental purposes without the payment of any royalties thereon or therefor.

BACKGROUND OF THE INVENTION

The present invention relates to laminated articles. More particularly, the invention relates to a method and apparatus for making such articles.

Laminates comprising stressed face sandwich structures having a lightweight core are well known. These structures include a lightweight sheet-like core material such as honeycomb resin, metal, fiber-resin combinations and the like, and outer cover sheet stress face members of metal, resin, fiber-resin, and the like. The stress members are laminated to the core material using conventional adhesives. A common way of making the structure is to use a heat-sensitive adhesive and to subject the composite to externally applied pressure while heating to form the laminate. Most of these adhesives, however, include volatile constituents which outgas during heating and this may result in failure of bond lines which in turn, can cause annoying vibrations and delamination.

It is also known to incorporate edge sealing members in lightweight laminates. For example, it is known to include balsa wood at the edges of honeycombed laminates. It is frequently desirable that these edge members, if used, are incorporated into the laminate at the same time that the article is laminated in a one-step process.

The present invention is concerned with the manufacture of cored, stressed face sandwich structures as typified by low density-cored laminates and in the bonding of thin impermeable skins to high density substrates that are selectively perforated to produce areas of non-support.

An essential feature of this invention is that it supports skins or face sheets in the aggregate while bonding operations are in progress. It thereby prevents stresses imposed by the static loading of mating assembled parts, and stressed developed by the curing adhesives, from causing surface irregularities.

This invention is especially useful and effective where the aerodynamic qualities of skins and face sheet, when assembled, demand that absolutely no core of substrate character shall be perceptible on the exterior surface. Builders of scaled (profile and structural) wind tunnel models of airfoils, missiles or segments thereof, may use this invention to increase the dimensional and profile accuracy of construction.

Also, this method beneficially affects the thermosetting adhesives used as bonding agents in low density-core assemblies. It inherently provides a cure environment, described later, that neutralizes associated outgassing. The resulting reduction in porosity improves the filleting action which in turn, greatly increases structural integrity.

This method can maintain skin and face surface perfection while bonding, in one integral, accurate operation interconnected items such as edge sealers, leading and trailing edges to core and face, ribs and spars to core and face, core edge to core edge, inserts of all types in any location.

There are however some features that the materials of construction must possess. The skins or face sheets must be impermeable to be effectively held against the form or support by the insert gas pressure medium. As regards low density-core sandwich assemblies the core must have open cells or perforated walls to facilitate the distribution of the pressure medium.

It is therefore an object of the present invention to provide a novel apparatus and method for the production of cored, stressed face laminate structures. It is a further object to provide such method and apparatus using conventional laminating materials which yet avoid problems previously associated with such materials such as out-gasing of adhesives. It is still a further object to provide such method and apparatus wherein edge members may be incorporated at the same time that the article is laminated.

BRIEF DESCRIPTION OF THE INVENTION

The foregoing and other objects which will be apparent to those having ordinary skill in the art are achieved according to the present invention by a method of laminating a structural member including the steps of providing a mold cavity frame having open sides and a closed periphery defining a mold cavity, positioning a low density core material in the mold cavity, the thickness of the core material corresponding substantially to the depth of the mold cavity, providing both sides of the core material with a laminating adhesive, positioning a first cover sheet member over one open side of the mold cavity frame, the first cover sheet being larger than the opening in the side of the frame and positioned to overlap the entire periphery of the frame to seal one side thereof, the first cover sheet being adjacent the adhesive provided on a first side of the core material, positioning a second cover sheet member over the other open side of the frame, the second cover sheet being larger than the opening of the frame and positioned to overlap the entire periphery of the frame to seal the other side thereof thus forming a closed mold cavity between the first and second cover sheets, the second cover sheet being positioned adjacent the adhesive provided on the other side of the core material, and simultaneously subjecting the opposed cover sheets to externally applied pressure and heat to laminate the cover sheets to the core material while maintaining an internally applied gas pressure within the sealed cavity to minimize out-gasing of the adhesive, the internal fluid pressure being less than the externally applied pressure. Apparatus according to the invention comprises an annular mold cavity frame having a peripheral wall and defining a laminating cavity within the peripheral wall, a first peripheral gasket on one side of the peripheral wall for sealing one side of said cavity with a first cover sheet member placed over the one side of the peripheral wall, a second peripheral gasket on the other side of the peripheral wall for sealing the other side of the cavity with a second cover sheet member placed over the other side of the peripheral wall, the peripheral wall forming, with the first and second cover sheet members, a closed mold cavity, means for applying external pressure to the cover sheet members for laminating the cover sheet members to a core material provided in the mold cavity, and means for introducing a gas under pressure into the mold cavity to reduce off-gasing of adhesive present in the cavity for bonding the core material to the cover sheet members.

DETAILED DESCRIPTION OF PREFERRED EMBODIMENTS

There follows a detailed description of a preferred embodiment of the invention, together with accompanying drawings. However, it is to be understood that the detailed description and accompanying drawings are provided solely for the purpose of illustrating a preferred embodiment and that the invention is capable of numerous modifications and variations apparent to those skilled in the art without departing from the spirit and scope of the invention.

Figure 1:
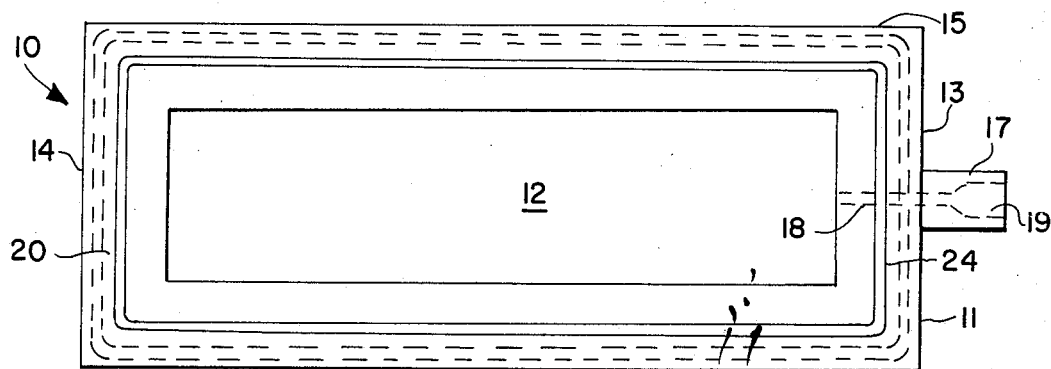
FIG. 1 is a diagrammatic plan view of a mold cavity frame used to make lightweight cored laminate structures according to the present invention.
Figure 2:
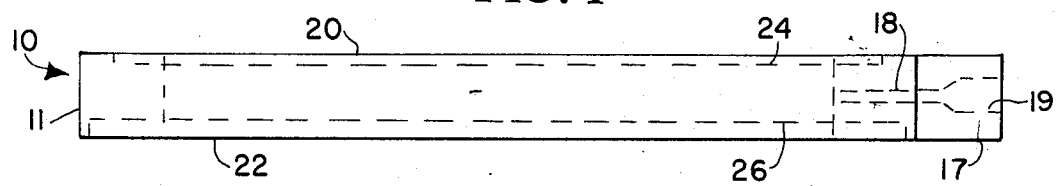
FIG. 2 is a diagrammatic front elevation of the mold cavity frame of FIG. 1.

A mold cavity frame as shown in FIGS. 1 and 2 is used to make a laminated article according to the invention. The frame 10 is in the form of an annular peripheral wall 11 defining a laminating mold cavity 12 within the peripheral wall. In the illustrated embodiment, the frame is rectangular and includes side portions 13, 14, 15, 16 defining a mold cavity 12 which is rectangular in plan view. Side portion 13 of wall 11 includes an extending portion 17. An aperture 18 extends through side portion 13 and extending portion 17 and its outer end 19 is enlarged and threaded to receive a gas pressure supply conduit shown diagrammatically in FIG. 4. Top surface 20 is provided with a peripheral cavity 24 for receiving a sealing gasket such as "O"-ring 23 shown in FIGS. 4 and 5. Bottom surface 22 is similarly provided with a peripheral cavity 26 for receiving a sealing "O"-ring 27. As shown, the "O"-rings are offset with respect to one another outwardly of frame opening 12.

Figure 3:
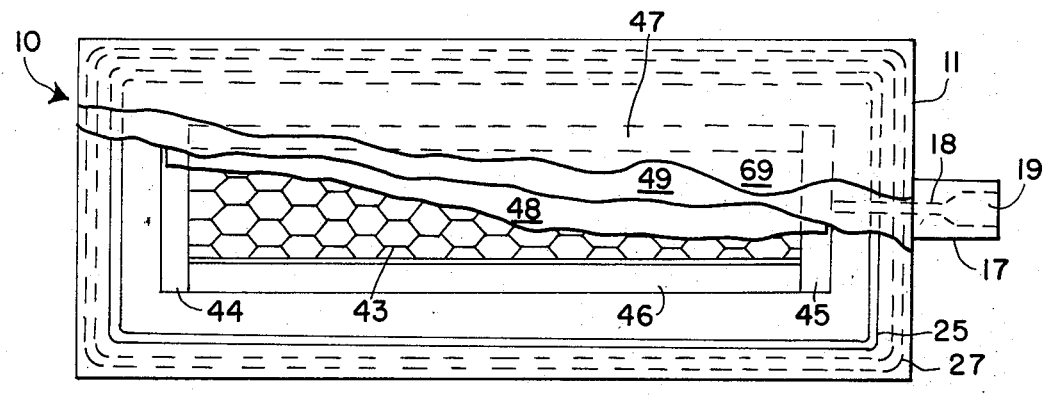
FIG. 3 is a diagrammatic plan view, partially broken, of the mold cavity frame of FIG. 1 with a cored, stressed face, structure shown in the mold cavity during manufacture.
Figure 5:
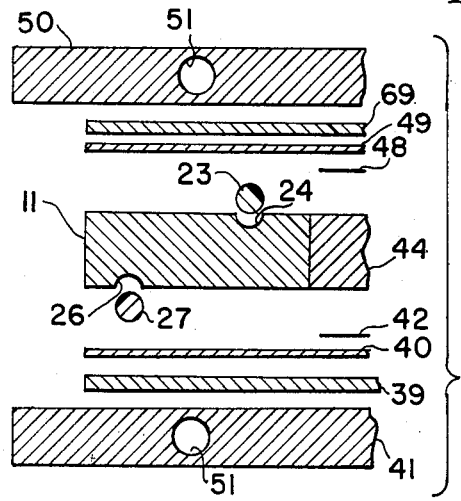
FIG. 5 is an exploded view of a segment of the parts shown in FIG. 4.
Figure 4:
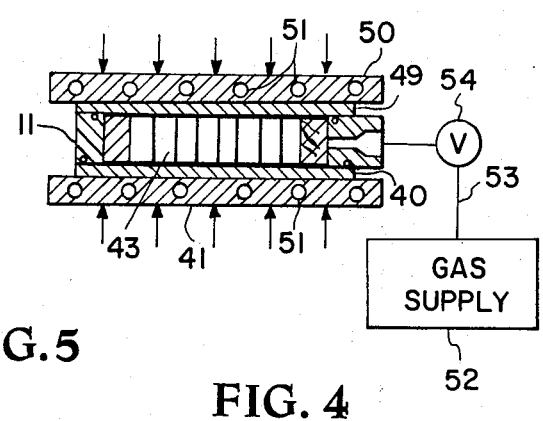
FIG. 4 is a diagrammatic front sectional elevation of the mold cavity frame of FIG. 3 shown positioned between the platens of a hydraulic press.

To fabricate a laminated article, the frame is used as shown in FIGS. 3 and 4. A first conventional cover sheet member 40 (FIG. 4) is positioned horizontally. The sheet member is conveniently placed on a metal form 39 on lower platen 41 of a conventional hydraulic press for the purpose. In this case, the cover sheet is aluminum sheet stock, having a thickness of 0.005 inches. The sheet member 40 is larger than the opening in the side of frame 10 and is positioned to cover peripheral wall 11 thus closing one side of the open sided frame. Preferably, frame member 10 includes gaskets, such as "O"-rings 23 and 27 and cover sheet 40 preferably extends beneath lower "O"-ring gasket 27 as shown in FIGS. 4 and 5. In the illustrated embodiment, cover sheet 40 is substantially coextensive with the periphery of wall 11 and thus covers gasket 27 thus sealing one side of mold cavity 12.

A sheet of low density core material 43, in this case No. 5052 aluminum honeycomb having a thickness of 0.230 inches, is cut in a rectangle and placed centrally of frame mold cavity 12 as shown in FIG. 3. The gap between the outer edges of the core material and the inner edges of frame wall 11 is filled with gas permeable balsa wood members 45, 46 and 47, cut from 0.231 inch thick sheet stock to substantially fill the frame opening. One end of the honeycomb abuts against metal bar 44 as shown. A top layer of adhesive film 48 of the same film as layer 42 is then applied and positioned over the core material similarly as layer 42. Finally, a top cover sheet member 49 of the same aluminum sheet stock as bottom member 40 is placed over the upper adhesive layer 48 such that member 49 covers the "O"-ring 25 provided in upper surface 20 of frame wall 11 thus sealing the other side of frame cavity 12.

A top metal form 69 is placed over sheet member 49 and a top platen 50 of a conventional hydraulic press is then positioned over the upper surface of top sheet member 49 and platen 50 is moved relatively towards platen 41 either by moving both platens toward each other or by moving one toward the other. Heat is simultaneously applied as by passing a hot fluid through conduits 51 provided in one or both platens. The heat applied is maintained at that required to activate the heat sensitive laminating adhesives layers 42 and 48.

In order to improve the lamination according to the invention an inert gas under pressure, such as for example, nitrogen, is simultaneously introduced into mold cavity 12 during bonding of the lamination. The gas under pressure is introduced into mold cavity 12 from a gas supply source 52 through a suitable conduit 53 connected to threaded portion 19 of aperture 18. A conventional pressure regulator 54 is used to regulate the pressure in the mold cavity.

The gas pressure in the mold cavity 12 is preferably raised after the laminate has been subjected to the external pressure of platens 41 and 50 and prior to heating the adhesive. This permits the cavity 12 to be sealed sufficiently to be gas-tight prior to introducing gas thereto and also causes the adhesive to be subjected to a positive pressure prior to the time that it might outgas at elevated temperatures. In the illustrated embodiment, the sandwich is subjected to a platen pressure of 500 p.s.i. and the gas pressure was maintained in cavity 12 at approximately 200 p.s.i. Platen temperature is then raised sufficiently for example 225–300° F., to activate the adhesive and, after the adhesive is set (approximately thirty-sixty minutes), gas pressure and platen pressure are relieved.

The laminate is removed from the mold cavity after first trimming upper sheet member 49 to a size less than that of the opening of cavity 12. The laminate is then cut to size and provides a lightweight aluminum honeycomb core, stressed face, laminated with balsa wood edges between aluminum stress forces. Due to the gas pressure maintained in the mold during setting of the adhesive, out-gasing of the adhesive is minimized and thus the bond integrity of the sandwich is excellent.

The principle of the operation involved relative to the skin/face support is analagous to an automotive tire and innertube. The skin/face representing the innertube, the support tooling representing the tire. The tooling is so designed that continuity of hermetic seal is maintained on the substrate side of the skin/face. This can usually be accomplished with "O"-ring grooves machined in that part of the tooling that is adjacent to the substrate side of the skin/face. "O"-ring or other seal glands are installed in areas of tooling and extensions of skin/face that are outside the useable area of the product itself. Edge sealers, leading and trailing edges, spars ribs, and all inserts are designed to the core thickness at their stations. In this manner continuity of skin/face prevails, obviating many sealing and tooling problems. Templates may be used for correct placement of insert hardware during assembly and as an accurate locative means for exposure after bonding.

The materials of construction of the laminate are conventional. Conventional cover sheet face members and conventional cores are employed. The core may be made up of different materials such as alternate, layers of honeycomb structure and sheets. The face sheets may be any stiff sheet material conventionally employed in laminate facings such as metal, plastic, resin-fiber composites, and the like. The lightweight core material is also conventional and may be any rigid, low density material such as honeycomb metal, plastic or the like, foamed materials, such as foamed plastic, or other conventional low density core material. Although lightweight core material has been employed in the specific embodiment described herein, the invention is not so limited and the use of any conventional metal, plastics, or the like substrate is considered within the scope of the present invention. Also, the form support employed in the process should always be parallel with the core or substrate employed. Thus, although the invention has been described relative to flat surfaces, it is not so limited and the process described herein may be employed to provide thin skin surfaces on spherical, conical, angular or any other configuration as so desired.

The laminating adhesives employed are conventional heat activated adhesives. The invention is particularly advantageous in connection with heat activated adhesives which outgas at temperatures normally employed to cure the adhesive. Example commercially available adhesives useful with the present invention may be purchased from the 3M Company, Adhesives, Coatings and Sealers Division, Minneapolis, Minn. under their tradename of Scotch-Weld Structural Adhesive Film, AF–41, AF–110, AF–111, AF–126, AF–126–2, and AF–130. The edging materials, when used, are also conventional and include wood, plastic, rubber, elastomers, metal, and the like. The edge members are preferably laminated to the cover face sheets simultaneously with the core. However, they may be subsequently inserted into suitable cavities formed during lamination of the core material.

In the illustrated embodiment, gas supply source 52 is a conventional nitrogen gas tank containing nitrogen at 2000 p.s.i. when full. However, any source of suitable inert gas may be employed. The externally applied pressure on the platen is maintained higher than the internal gas pressure to keep cavity 12 sealed. Preferably, the external pressure is at least twenty five percent greater than the internal gas pressure.

In order to effect good lamination, the combined thickness of the adhesive and core material should exceed the depth of the mold cavity. Where the core structure is substantially incompressible, as in the illustrated embodiment, the combined thickness of the core material and adhesive preferably does not exceed about four percent of the mold cavity depth. The thickness of the core material itself in the specific embodiment described should be within about two percent of the cavity depth. Where the core material is more resilient, greater latitude is permissible.

While a one piece mold cavity frame has been illustrated, it will be understood that two piece frames can be used such that the laminated article can be removed without first trimming the laminate. For example, the one piece frame of FIG. 1 can be replaced by two "C" shaped frames securable together by conventional clamping means into the rectangular shape shown in FIG. 1. Where sealing gaskets are employed, these would be similarly split and further gaskets preferably employed between the mating ends of the mold halves.

As will also be well understood by those versed in mold design and machine shop practice, this method may be applied to many shapes other than flat, as shown here. Airfoil, conical, round, angled and combinations thereof are within its scope. Also machining and contouring techniques have been developed which allow honeycomb or other low density-core material to be used without regard to the complexity of the part.

What is claimed is:

1. A method of laminating a structural member substantially free from surface irregularities comprising the steps of:

providing a mold cavity frame having open sides and a closed periphery defining a mold cavity;

positioning a low density core material in said mold cavity, the thickness of said core material corresponding substantially to the depth of said mold cavity;

positioning gas-permeable edging material of substantially the same thickness as that of said core material adjacent each edge of said core material in said mold cavity, providing both sides of said core material with a laminating adhesive;

positioning a first cover sheet member over one open side of said mold cavity frame, said first cover sheet being larger than the opening in the side of said frame and positioned to overlap the entire periphery of said frame and in sealing engagement with one side thereof, said first cover sheet being adjacent the adhesive provided on a first side of said core material;

positioning a second cover sheet member over the other open side of said frame, said second cover sheet being larger than the opening of said frame and positioned to overlap the entire periphery of said frame and in sealing engagement with the other side thereof thus forming a closed mold cavity between said first and second cover sheets, said second cover sheet being positioned adjacent the adhesive provided on the other side of said core material; and simultaneously subjecting the opposed cover sheets to externally applied mechanical pressure and heat to laminate the cover sheets to the core material while maintaining an internally applied gas pressure within said sealed cavity to minimize out gasing of said adhesive, the internal fluid pressure being less than the externally applied pressure.

2. A method as claimed in claim 1 wherein said gas pressure is maintained by introducing a gas under pressure into said mold cavity through an aperture in a wall of said mold cavity frame.

3. A method according to claim 1 wherein said core material is a lightweight honeycomb structure.

4. A method according to claim 1 wherein said core sheet is a metal.

5. A method according to claim 4 wherein the metal is aluminum.

6. A method according to claim 1 wherein the externally applied pressure is at least 25% greater than the internally applied gas pressure.

7. A method according to claim 1 wherein the adhesive is a preformed heat-sensitive film.

8. A method according to claim 1 wherein the core material is substantially incompressible and the thickness of the core material is within 2% of the depth of said mold cavity frame.

9. A method according to claim 1 wherein the core material is substantially incompressible and wherein the combined thickness of the core material and adhesive layers prior to pressing is greater than the depth of said mold cavity frame by up to 4%.

10. A method according to claim 1 wherein the laminated structural member is removed from said mold cavity frame by trimming of the said cover sheet members to a size less than the size of the frame opening.

References Cited
UNITED STATES PATENTS

| | | | |
|---|---|---|---|
| 2,816,355 | 12/1957 | Herman | 29—471.1 |
| 3,011,254 | 12/1961 | Melill et al. | 29—471.1 |
| 3,067,507 | 12/1962 | Titus | 156—285 |
| 3,110,961 | 11/1963 | Melill et al. | 29—455 |
| 3,373,480 | 3/1968 | Fuchs | 29—471.1 |
| 3,168,782 | 2/1965 | Cochran | 29—471.1 |
| 3,365,787 | 1/1968 | Forsberg et al. | 29—471.1 |

DOUGLAS J. DRUMMOND, Primary Examiner

C. WESTON, Assistant Examiner

U.S. Cl. X.R.

29—455, 471.1